ELECTRON BEAM SCANNING DEVICE UTILIZING DIGITAL CONTROL SIGNALS, AND CAPABLE OF RANDOM ADDRESSING

Original Filed Dec. 6, 1965 4 Sheets-Sheet 1

INVENTORS
DONALD E. HULTBERG
LESTER A. JEFFRIES

INVENTORS
DONALD E. HULTBERG
LESTER A. JEFFRIES

INVENTORS
DONALD E. HULTBERG
LESTER A. JEFFRIES

INVENTORS
DONALD E. HULTBERG
LESTER A. JEFFRIES

United States Patent Office

Re. 27,520
Reissued Oct. 31, 1972

27,520

ELECTRON BEAM SCANNING DEVICE UTILIZING DIGITAL CONTROL SIGNALS, AND CAPABLE OF RANDOM ADDRESSING

Donald E. Hultberg, Venice, and Lester A. Jeffries, Palos Verdes, Calif., assignors to Northrop Corporation, Beverly Hills, Calif.

Original No. 3,408,532, dated Oct. 29, 1968, Ser. No. 511,747, Dec. 6, 1965. Application for reissue Oct. 28, 1969, Ser. No. 871,979
Int. Cl. H01j *29/41*
U.S. Cl. 315—12 22 Claims

Matter enclosed in heavy brackets [ ] appears in the original patent but forms no part of this reissue specification; matter printed in italics indicates the additions made by reissue.

ABSTRACT OF THE DISCLOSURE

This invention relates to an electron beam scanning device, and more particularly to such a device which is operative in response to a digital control signal and is capable of random addressing.

Figure 1:
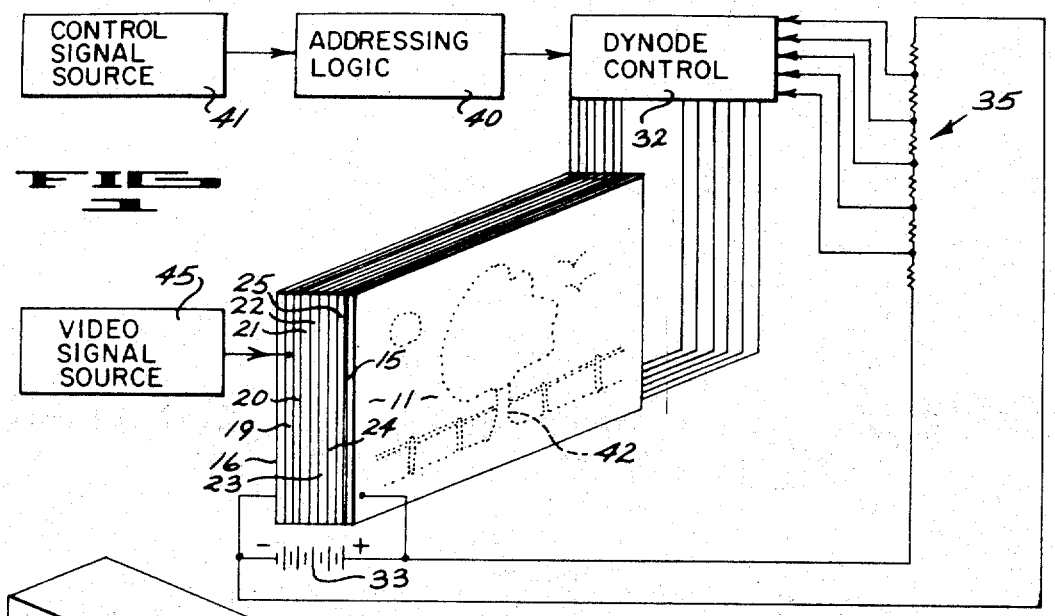

Electron beam scanning is used extensively in cathode ray devices for applications such as video camera tubes, video display tubes such as television picture tubes, and memory and storage tubes. These cathode ray scanning devices of the prior art have several shortcomings. Firstly, a rather bulky elongated configuration is required to accommodate the electron gun and deflection system inherent to this type of device. The dimensions of such structure are particularly cumbersome where relatively large display screens are involved. Efforts to minimize the dimensions of such structure often result in a severe sacrifice of the linearity and definition of the display. Further, such devices are readily subject to ambient electrostatic and electromagnetic fields which can impair the linearity and focus. Also, such cathode ray tube devices are adapted to scan in a relatively cyclical fashion and cannot randomly be addressed to any point on the target without sacrificing resolution and speed of operation. This somewhat impairs the efficiency of their operation in response to randomly addressed inputs such as might be involved in a memory or storage tube or a specialized display application.

While efforts have been made in the prior art to provide a digitally responsive display system capable of random addressing, such systems have been unable to provide either the compact structure, speed of operation, definition, or the brightness of display to be desired. Further, many of these systems require extensive auxiliary control systems for providing the addressing operations.

The device of this invention overcomes the shortcomings of prior art devices in providing a relatively flat thin electron beam scanning device capable of high linearity and definition which is relatively unaffected by ambient electrostatic and electromagnetic fields. The device of the invention utilizes electron multiplication techniques which assure adequate electron current at the target for proper operation. Further, the device of the invention operates in response to a digial control signal and is capable of random addressing as well as regular scanning.

The device of the invention achieves the desired end results by utilizing a plurality of coded dynode members which are sandwiched between an electron emitting cathode and a target plate. Each dynode has a plurality of apertures formed therein which are effectively aligned with corresponding apertures on all the other dynodes. The dynode aperture portions each have electron multiplying surfaces therein for multiplying the electrons in the electron beam by secondary emission techniques. The dynodes further each have a pair of separate conductive portions thereon forming "fingers," each conductive portion being electrically insulated from its paired portion and such conductive portions being arranged in a predetermined coded "finger" configuration. Digital control means are connected to the conductive portions of each dynode to excite one of each pair thereof with a potential such as to accelerate the flow of electrons from the cathode to the target and the other of each pair with a potential such as to retard the flow of electrons. The digital control means operates in response to addressing logic. By this technique, any one element of the target as defined by the aligned dynode hole portions can be excited at any one time in response to various digitally controlled excitation inputs to the dynodes.

It is therefore an object of this invention to provide an improved electron beam scanning device.

It is a further object of this invention to provide an electron beam scanning device of relatively flat and compact construction.

It is still another object of this invention to provide an electron beam scanning device having high linearity and which is relatively insensitive to ambient electrostatic and electromagnetic fields.

It is still a further object of this invention to provide an electron beam scanning device directly operable in response to a digital control signal which is capable of random addressing.

It is still another object of this invention to provide an electron beam scanning device in which the amplitude of the scanning beam is supplemented by electron multiplication techniques.

It is still another object of this invention to provide an electron beam scanning device capable of utilization as an image display, memory device, or image sensing device.

Other objects of this invention will become apparent from the following description taken in connection with the accompanying drawings, of which—

Figure 2:
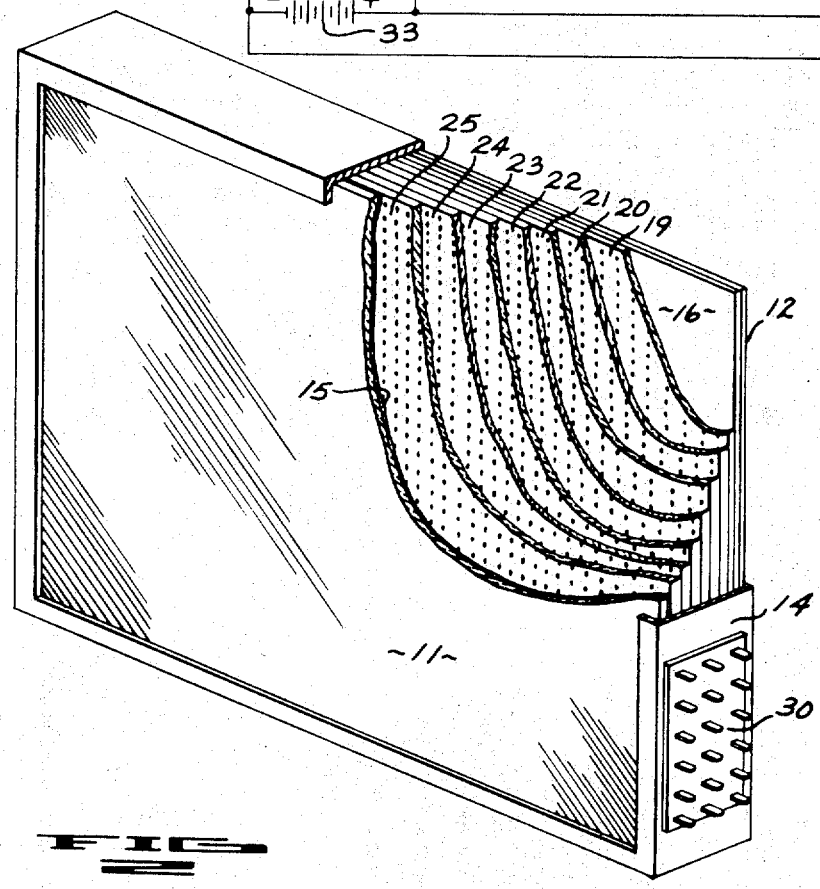
Figure 3:
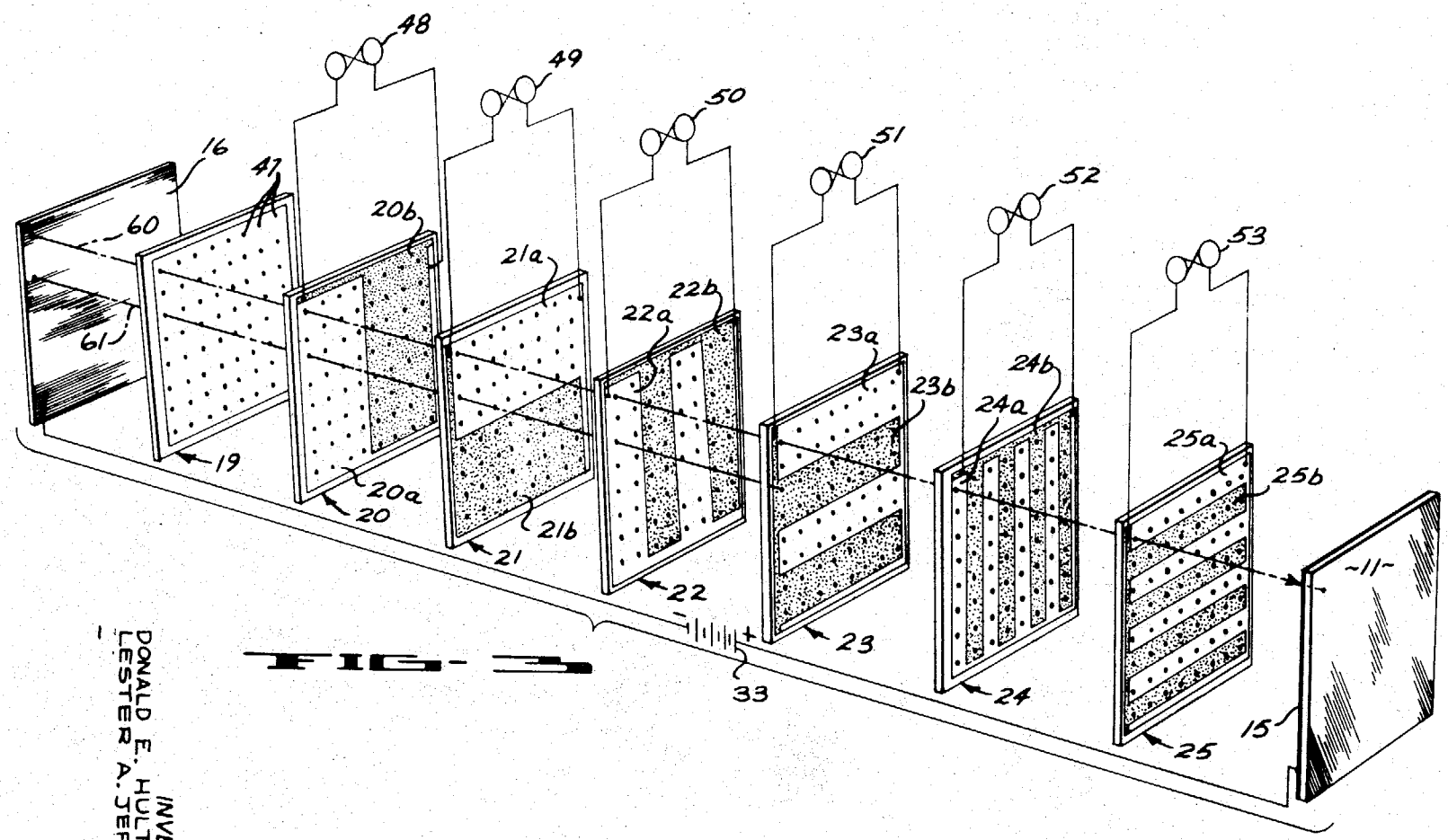
Figure 4:
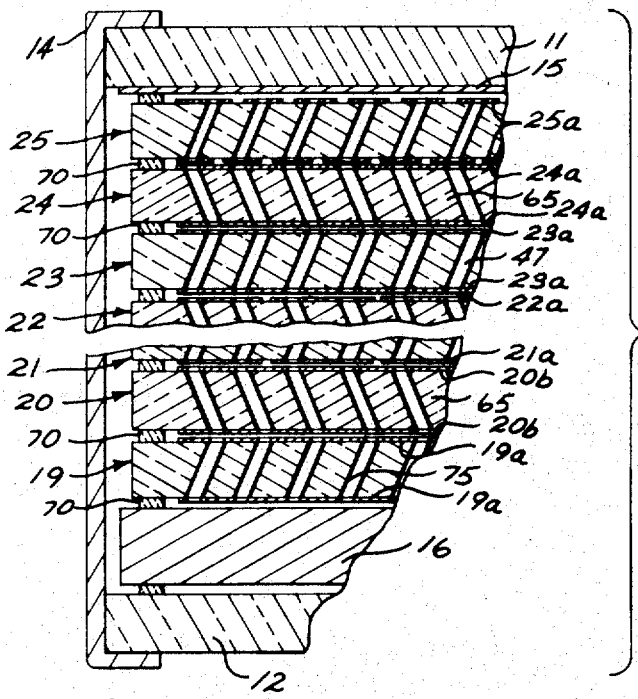
Figure 6:
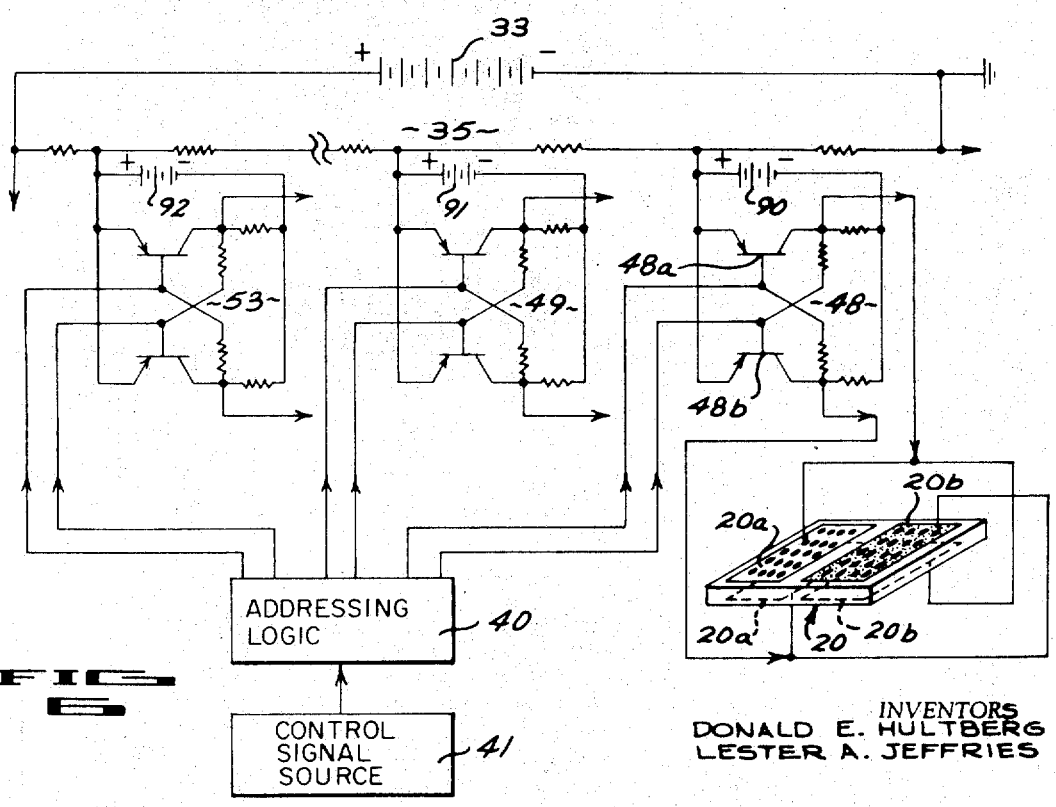
Figure 5:
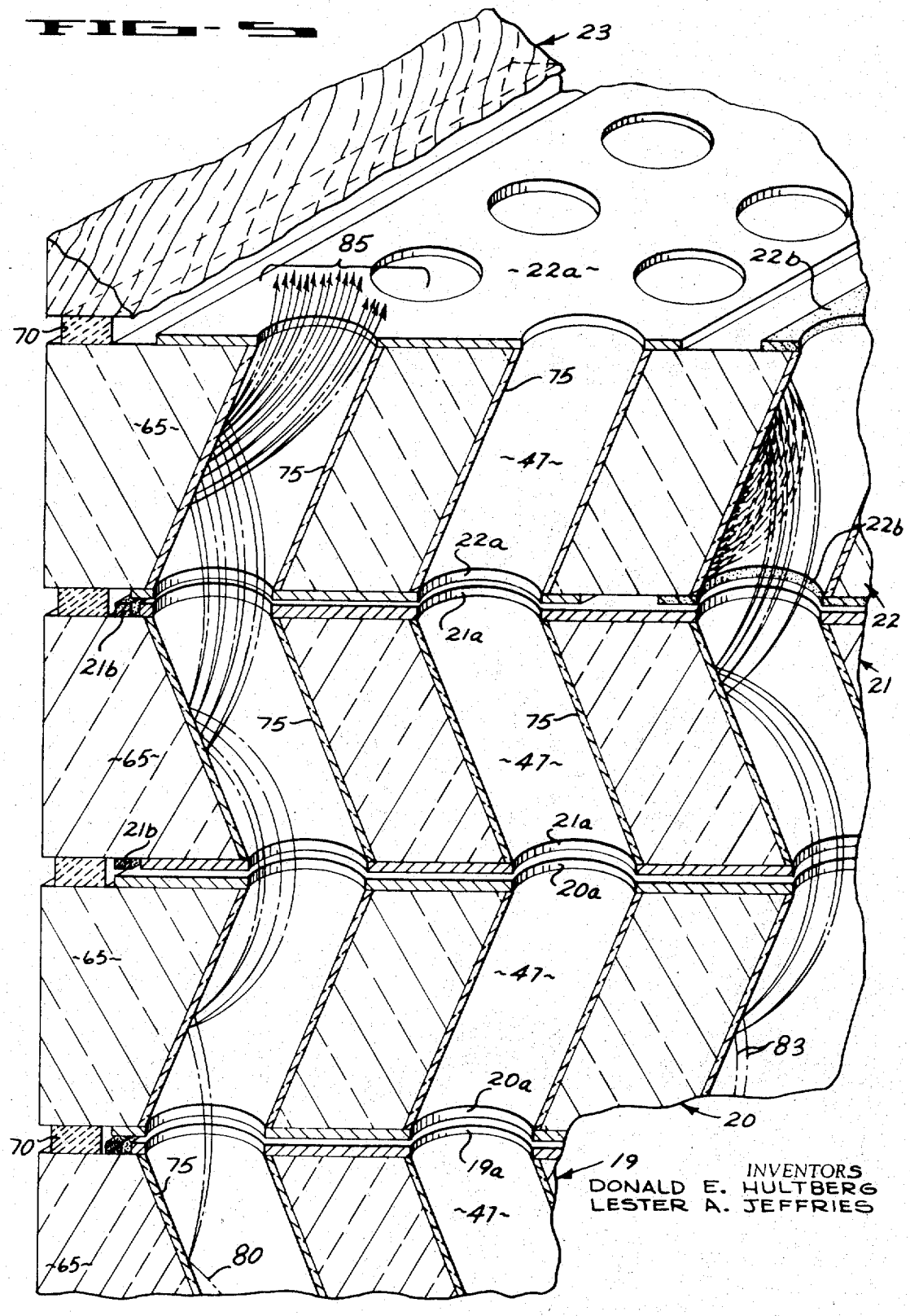

FIG. 1 is a schematic drawing illustrating the operation of one embodiment of the device of the invention, FIG. 2 is a perspective drawing illustrating the general structure of an embodiment of the device of the invention, FIG. 3 is a schematic drawing illustrating dynode coding which may be utilized in one embodiment of the device of the invention, FIG. 4 is an elevational cross sectional view illustrating the structure of one embodiment of the device of the invention, FIG. 5 is an elevational cut-away view illustrating how electron multiplication is achieved in the embodiment of the device of the invention illustrated in FIG. 4, and FIG. 6 is a schematic drawing illustrating the operation of the digital control circuitry utilized in the embodiment of the device of the invention of FIGS. 4 and 5.

Referring now to FIG. 2, one embodiment of the device of the invention is illustrated. This particular embodiment, for illustrative purposes, is shown as a display device. It can be readily appreciated, however, that the same general construction can be utilized for an image sensor or a memory tube by appropriate modifications within the purview of those skilled in the art. A casing is formed by image plate 11, back plate 12 and frame 14 which are joined together in airtight relationship and the enclosed space evacuated to provide a vacuum environment. On the inner surface of image plate 11 is a phosphor coating 15. Back plate 12 has an electron emissive cathode 16 mounted thereon. Cathode 16 is preferably of the cold cathode type and may have a radio-active or photo emissive surface which is suitable for providing an adequate electron current.

Sandwiched between cathode 16 and plate 11 are a control grid member 19 and a plurality of dynode members 20–25. Each of these dynode members, as to be explained fully further on in the specification, includes a pair of oppositely positioned conductive sections which are formed on an insulating member. A plurality of electron beam directing apertures are formed in the dynode members. The various power and control signals are fed to the various dynodes, the grid and the cathode and phosphor target through electrical receptacle 30.

Referring now to FIG. 1, the general operation of the device of the invention is illustrated. An electron accelerating potential supplied by DC power source 33 is applied between phosphor target 15 and cathode [1] *16*. Various graduated potentials between the target potential and the cathode potential are supplied to dynode control 32 from voltage divider 35. As to be explained in detail in connection with FIG. 6, dynode control 32 supplies an electron beam accelerating potential to half of the conductive portions of each of dynodes 20–25, and an electron beam repelling potential to the other half of the conductive portions of each of the dynodes. Thus, at any one time half of the control area of each dynode is repelling the electron beam while the other half of the control area of each dynode is accelerating the beam. The dynode accelerating and repelling conditions at any particular time are controlled in response to addressing logic 40 which actuates dynode control 32 in response to a control signal source 41. Thus, control signal source 41 may cause dynode control 32 to effect a raster scanning pattern on target 15 such that a video image 42 is generated in response to video signals fed to control grid 19 from a video signal source 45. It is to be noted, that while a device for showing a conventional video display is shown in FIG. 1 for illustrative purposes, that dynode control 32 can also be made to operate in response to a random addressing input which will excite any portion of target 15 directly without passing through adjacent portions of the target, i.e., the beam can be shifted from one side of the screen to the other without passing through any of the intermediary points. This will become apparent as the description proceeds.

Referring now to FIG. 3, an exploded schematic drawing is shown illustrating the operation of one embodiment of the device of the invention. Positioned between electron emitting cathode 16 and target 15 is a control grid 19 and a plurality of dynode members 20–25. Grid 19 and each of dynode members 20–25 has a series of apertures 47 formed therein, each aperture on the control grid and each dynode being substantially aligned with an associated aperture on each of the other dynodes. Dynode 20 has a first electrically conductive portion 20a covering substantially half of its broad surface area, and a second electrically conductive portion 20b covering substantially the other half of such broad surface area, such conductive portions being electrically insulated from each other and connected to opposite outputs of flipflop 48. Thus, when conductive portion 20a is receiving one potential output of flipflop 48, conductive portion 20b is receiving the other potential output thereof, and vice versa. Dynodes 21–25 have paired conductive portions 21a–25a and 21b–25b, which are insulated from each other similarly to sections 20a and 20b and operate in the same fashion in response to flipflops 49–53 respectively.

Each of the dynode conductive portions covers substantially one half the broad surface area of its associated dynode but such portions are arranged in different finger patterns, such that by proper actuation of flipflops 48–53 an electron beam can be made to pass from cathode 16 through to target 15 through only one selected set of aligned apertures 47 at any one time. Such operation is illustrated in FIG. 3 for a combination of flipflop actuations whereby dynode sections 20a–25a have an electron beam accelerating potential thereon and whereby dynode portions 20b–25b (indicated by stippling) have an electron beam repelling potential thereon. For the example shown in FIG. 3, it can be seen that the beam represented by the line 60 is the only one that can pass all the way through to the target. All other beams, such as for example that indicated by the line 61, are prevented from passage by a repelling potential (in this instance provided by dynode portion 23b) somewhere along their respective paths. Thus, it can be seen that by various combined actuations of flipflops 48–53 in response to gating control signals, various scanning patterns for either regular scanning or random addressing of the target can be achieved. As to be explained further on in the specification, the beam current is amplified appreciably by electron multiplication techniques to assure sufficient beam current at the target.

Referring now to FIGS. 4 and 5, the structural features of one embodiment of the device of the invention are shown. The entire unit is housed in a vacuum tight housing formed by plates 11 and 12 and frame 14. Cathode 16 may be fabricated of electrically conductive material that has been sufficiently radio activated to cause electron emission therefrom at ambient temperatures. If so desired, other types of cathodes such as those of the thermionic or photo-emissive type may also be utilized. Control grid 19 and dynodes 20–25 each comprises a plate 65 of a nonconductive material, such as glass, having thin metallic coatings 19a–25a and 20b–25b respectively on opposite sides thereof. Such metallic coatings are arranged in accordance with patterns such as indicated in FIG. 3 to provide a desired coding. It should be noted, of course, as shown in FIG. 3, that the control grid 19 has allover metallic coatings on both sides thereof and hence can be used for intensity modulation of the beam.

Target 15 is formed by a phosphorescent coating on the inner surface of plate 11. It is to be noted, of course, that any suitable insulating material may be utilized in lieu of glass for plates 65. The cathode, the control grid and the various dynodes are separated from each other by means of insulator strips 70, the strips and the various units being joined together to form an integral unit by any suitable means such as cementing. Apertures 47 which are formed in plate members 65 are angulated with respect to the horizontal to form a zigzag pattern. It has been found that the use of such a zigzag pattern enhances the electron multiplication by providing a greater incidence of electrons against the sides of the channels. The sides of apertures 47 are coated with a coating 75 of a material such as lead oxide or tin oxide, which will provide good secondary electron emission with the impingement of electrons thereon. In an operative embodiment of the device of the invention, it has been found that good results can be achieved with apertures having a length which is five times their width.

Referring now particularly to FIG. 5, the electron multiplication achieved in the device of the invention is illustrated. Single line 30 illustrates an initial incoming electron impinging against coating 75. As can be seen, the impingement of this electron causes the emission of two electrons. This electron multiplication process is repeated as the beam proceeds, until, as can be seen, a fairly large number of electrons 85 are generated. The electron current by virtue of the secondary emission process is greatly multiplied for each electron emitted from the cathode. It is to be noted that more (or in some instances even less) than two electrons can be generated by secondary emission in any instance and the binary multiplication process shown is merely illustrative of how secondary emission accomplishes an increase in the electron current. As can be seen, the electrons 83 are repelled by dynode portions 22b which have a repelling potential therebetween and thus never pass through to the target.

*In further explanation, inasmuch as the pair of conductive coatings 19a on opposite sides of control grid 19 are in contact with opposite ends of the electron mul-*

*tiplying surfaces 75 on the walls of apertures 47 in the control grid, and the electron multiplying surfaces extend continuously between the ends of the apertures, with an accelerating potential applied between the pair of conductive coatings 19a there will be a potential gradient along the electron multiplying surfaces in the apertures and electron multiplication will take place therein as indicated at the lower left of FIG. 5.*

*Similarly, inasmuch as the pair of conductive coatings 20a on opposite sides of control dynode 20, and likewise the pair of conductive coatings 20b on opposite sides of dynode 20, are in contact with opposite ends of the electron multiplying surfaces on the walls of apertures 47 controlled thereby and the multiplying surfaces extend continuously between the ends of the apertures, with an accelerating potential applied between one pair of conductive coatings (say 20a) electron multiplication will take place in the apertures controlled thereby. On the other hand, with a repelling potential applied to the other pair of conductive coatings (say 20b) in the opposite direction to the aforesaid accelerating potential, secondary electrons emitted from the walls of the apertures controlled thereby will travel backward in the respective apertures and be collected, thereby substantially preventing flow of the electrons through the apertures and closing the respective channels. The same is true for the succeeding control dynodes 21–25.*

*The operation is illustrated in FIG. 5 where, in the left-hand channel, pairs of coatings 20a, 21a and 22a all have accelerating potentials applied thereto, and electron multiplication takes place in the aligned apertures of successive control dynodes 20, 21, 22. On the other hand, in the right-hand channel, electron multiplication takes place in the aligned apertures of control dynodes 20 and 21, since accelerating potentials are applied thereto through pairs of coatings 20a and 21a, but in control dynode 22 a reverse repelling potential is applied to the pair of coatings 22b, thereby causing secondary electrons to travel backward in the upper right aperture controlled thereby and be collected.*

Referring now to FIG. 6, an embodiment of a scanning control that may be utilized in the device of the invention is shown. For the convenience of illustration, only three of the flipflops and one of the dynodes are shown, this in view of the fact that all of the other flipflops and dynodes are operated in the same fashion.

Flipflops 48, 49 and 53 are energized by means of power sources 90, 91 and 92 respectively. Each such power source, however, is referenced at a different potential point along voltage divider 35 which receives the potential of power source 33 thereacross. *As will be noted, the reference potentials supplied by voltage divider 35 are progressively higher for successive flipflops 90, 91, 92, thereby referencing the accelerating potential of each succeeding dynode member to a higher bias potential than the accelerating potential of the preceding dynode member. Each flipflop produces a pair of output voltages with a potential difference therebetween, and respective pairs of output voltages are at progressively higher potentials.* Flipflops 48, 49 and 53 are actuated in response to the output of addressing logic 40, which in turn is controlled by control signal source 41. At any one time either one or the other of the flipflop stages of each of flipflops 48, 49 and 53 is conductive, while the other is at cutoff.

The collector of flipflop stage 48a is connected to the top section of conductive portion 20a, and the bottom section of conductive portion 20b, while the collector of flipflop stage 48b is connected to the top section of conductive portion *20b and the bottom section of* 20a. Thus, for example, when flipflop stage 48a is conductive and stage 48b non-conductive, the top section of conductive portion 20a will have a positive potential with respect to the bottom section thereof, while the bottom section of conductive portion 20b will have a positive potential with respect to the top section thereof. When the flipflop reverses such that section 48b becomes conductive and section 48a becomes non-conductive, an opposite polarity condition will be presented to the dynode portions. The potential of power sources 90–92 is made sufficient to produce an adequate repelling signal to the electron beam (e.g. of the order of 200 volts). While a single high voltage repelling signal can be used for all the dynodes, the use of separate incremental potential gradients, as shown and described in connection with FIG. 6, greatly alleviates dynode insulation problems. In this fashion the flipflops are utilized at the various dynodes to control the electron beam. As already noted, each of the flipflops is used in the same fashion as described for flipflop 48 and dynode 20 for the control of their respective dynodes.

Thus, with a relatively small number of flipflops, complete random addressing control can be achieved in the device of the invention. Of course, as the number of dynode stages in increased, the size of the individual apertures can be decreased and thus the definition of the device improved. While the intensity of the electron beam would normally tend to decrease with the number of dynodes, this problem is obviated by virtue of the electron multiplication achieved in the device of the invention which proportionately compensates for the diminution of the electron beam intensity as the number of control apertures and dynodes are increased. It is to be noted that very good focusing and linearity is achieved in the device of the invention by virtue of the utilization of alined apertures in controlling the electron beam. Thus, such beam is tightly controlled through its entire path, and is not subject to ambient disturbances.

While for illustrative purposes the dynode pattern arrangement has been illustrated and described for a natural binary coding, other types of coding such as, for example, "GRAY" coding can also be used and may in some instances provide certain advantages.

The device of the invention thus provides means for replacing bulky cathode ray tube equipment with a relatively flat scanner which has the advantages of being operative in response to digital control signals and capable of random addressing.

While the device of the invention has been described and illustrated in detail it is to be clearly understood that this is intended by way of illustration and example only, and is not to be taken by way of limitation, the spirit and scope of this invention being limited only by the terms of the following claims.

We claim:

1. An electron beam scanning device comprising a gas evacuated sealed casing member, an electron source mounted within said casing member, a target member mounted within said casing member opposite said electron source, a power source connected between said target member and said electron source for providing an electron accelerating potential therebetween, a plurality of dynode members sandwiched between said electron source and said target member for controlling the flow of electrons therebetween, said electron source, said target member and said dynode members being alined opposite each other, said dynode members each *including a plate of insulating material* having a plurality of conductive *digitally* coded finger portions which are insulated from each other, said dynode members [further] each having a plurality of aperture means formed therein *with respective electron multiplying surfaces* for channeling *and multiplying* the flow of electrons between said electron source and said target member, and

*digital* control means for selectively applying an electron accelerating potential to at least one of the finger portions of each of said dynode members and an electron repelling potential to the others of the finger portions of each of said dynode members, whereby said dynode members cause an electron beam from said electron source to said target member to be addressed in response to said control means.

2. The device as recited in claim 1 wherein said target member, said electron source and said dynode members are substantially flat and are alined with their broad surfaces opposite each other.

3. The device as recited in claim 2 wherein said aperture means are distributed over the broad surface area of said dynode members with each dynode member aperture means being alined with corresponding aperture means on each of the others of said dynode members.

4. The device as recited in claim 1 wherein said dynode members have similar finger portions on the opposite broad surfaces thereof, said control means including means for alternatively applying a potential in one polarity or a polarity opposite said one polarity between oppositely positioned finger portions.

5. The device as recited in claim 2 wherein said electron source comprises a radioactive cathode.

6. An electron beam scanning device comprising a gas evacuated sealed casing means, a substantially flat cathode member mounted wtihin said casing means, a substantially flat target member mounted within said casing means opposite said cathode member, a power source connected between said target and cathode member[s] for providing an electron accelerating [electron] field therebetween, a plurality of substantially flat dynode members sandwiched between said cathode and target members for controlling the flow of electrons therebetween, said cathode, target and dynode members being alined with their broad surfaces opposite each other, said dynode members each *including a plate of insulating material* having a plurality of conductive *digitally* coded finger portions on at least one of the broad surfaces thereof which are insulated from each other, said dynode members [further] each having a plurality of apertures formed therein running from one broad surface to the opposite broad surface thereof and distributed over the broad surface area thereof *with respective electron multiplying surfaces associated with the apertures,* the apertures of each of said dynode members being alined with corresponding apertures on each of the others of said dynode members, and

*digital* control means for selectively applying an electron accelerating potential to at least one of the finger portions of each of said dynode members and an electron retarding potential to the others of the finger portions of each of said dynode members, whereby said dynode members cause an electron beam to pass from said cathode member to said target member through only one set of said alined apertures at a time in response to said control means.

7. The device as recited in claim 6 wherein said alined dynode apertures are arranged in a zigzag pattern.

8. The device as recited in claim 6 wherein each finger portion comprises two similar finger sections located opposite each other on the opposite broad surfaces of said dynode members.

9. The device as recited in claim 6 wherein said control means includes a plurality of flip-flops, the outputs of each said flip-flops being connected to oppositely drive the finger portions of an associated one of said dynode members, and addressing logic means for actuating said flip-flops.

*10. The device as recited in claim 1 in which said plurality of coded finger portions are binary coded.*

*11. An electron beam scanning device comprising*

*(a) a gas evacuated sealed casing,*

*(b) an electron source mounted in said casing,*

*(c) a target member mounted in said casing opposite said electron source,*

*(d) a power source connected between said target member and said electron source for providing an electron accelerating potential from electron source to target member,*

*(e) a plurality of addressing control dynode members each having a plurality of apertures therein with electron multiplying surfaces on the walls of said apertures,*

*(f) said addressing control dynode members being sandwiched between said electron source and said target member with the apertures therein in alinement for channeling and controlling the flow of electrons therebetween,*

*(g) conductive means on opposite sides of each of said addressing control dynode members extending adjacent opposite ends of the apertures therein for controlling the potential difference between opposite ends of the apertures,*

*(h) said conductive means having a plurality of digitally coded finger portions on at least one side of the respective dynode member which are insulated from each other,*

*(i) and digital control means for selectively applying electron accelerating potentials between at least one of said finger portions of each of said addressing control dynode members and the conductive means on the other side thereof to selectively address electrons from said source to said target member with electron multiplication by said dynode members,*

*(j) said digital control means including means for applying potentials between the others of the finger portions of each of the dynode members and the conductive means on the other side thereof for substanially preventing flow of electrons through the apertures controlled thereby.*

*12. A device in accordance with claim 11 in which the apertures in said dynode members are inclined to form zigzag channels.*

*13. A device in accordance with claim 11 in which said digital control means includes means for referencing the accelerating potential of each succeeding dynode member to a higher bias potential than the accelerating potential of the preceding dynode member.*

*14. A device in accordance with claim 11 in which said addressing control dynode members comprise a plate of insulating material with said apertures extending between the broad surfaces thereof and distributed over said broad surfaces, respectively, and said conductive means comprises conductive coatings on opposite broad surfaces of the respective plate of insulating material, the conductive coating on at least one side of the respective plate being divided into portions forming said digitally coded finger portions.*

*15. A device in accordance with claim 14 in which said potentials for substantially preventing flow of electrons through the apertures are opposite in direction to said accelerating potentials to repel electron flow in the apertures controlled thereby.*

*16. A device in accordance with claim 15 in which said digital control means includes a plurality of circuits each including means for producing a pair of output voltages with a potential difference therebetween, and means for biasing said plurality of circuits to progressively higher potentials whereby respective pairs of output voltages are at progressively higher potentials, said plurality of circuits of progressively higher potentials being connected to respective addressing control dynode members successively from said electron source to said target whereby said pair of output voltages from each circuit provides said electron accelerating and repelling potentials to the respective dynode member.*

*17. A device in accordance with claim 14 in which said conductive coatings contact the electron multiplying surfaces on the walls of the apertures adjacent thereto.*

*18. A device in accordance with claim 17 in which said electron multiplying surfaces extend continuously between the ends of the apertures, respectively.*

*19. A device in accordance with claim 18 in which said potentials for substantially preventing flow of electrons through the apertures are opposite in direction to said accelerating potentials to repel electron flow in the apertures controlled thereby.*

*20. A device in accordance with claim 19 in which said digital control means includes a plurality of circuits each including means for producing a pair of output voltages with a potential difference therebetween, and means for biasing said plurality of circuits to progressively higher potentials whereby respective pairs of output voltages are at progressively higher potentials, said plurality of circuits of progressively higher potentials being connected to respective addressing control dynode members successively from said electron source to said target whereby said pair of output voltages from each circuit provides said electron accelerating and repelling potentials to the respective dynode member.*

*21. A device in accordance with claim 20 in which said plurality of digitally coded finger portions are binary coded.*

*22. A device in accordance with claim 14 including a control grid for intensity modulation of the beam of*

*electrons addressed to said target member, said control grid comprising a plate of insulating material having a plurality of apertures therein with electron multiplying surfaces on the walls of said apertures and conductive coatings on opposite broad surfaces of said plate in contact with respectively opposite ends of the electron multiplying surfaces in said apertures, said control grid being sandwiched between said electron source and said target member with the apertures thereof in alinement with the apertures of said addressing control dynode members.*

References Cited

The following references, cited by the Examiner, are of record in the patented file of this patent or the original patent.

UNITED STATES PATENTS

| | | | |
|---|---|---|---|
| 2,964,672 | 12/1960 | Nixon | 315—21 |
| 3,421,042 | 1/1969 | Hultberg | 315—12 |

RODNEY D. BENNETT, Primary Examiner

B. L. RIBANDO, Assistant Examiner

U.S. Cl. X.R.

315—18